3,201,795
SUPPORT FOR A PLURALITY OF EYE EXAMINATION INSTRUMENTS

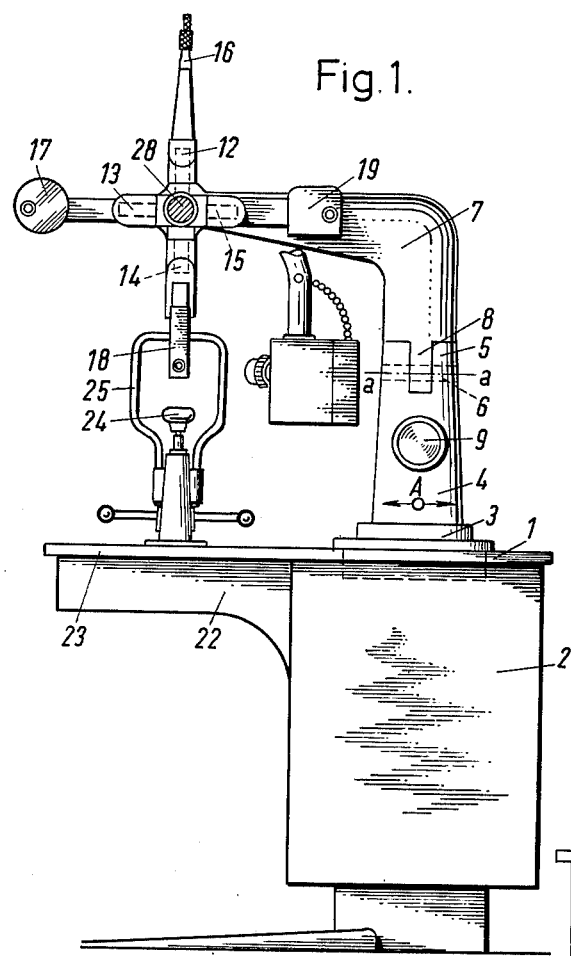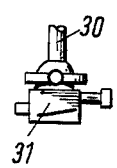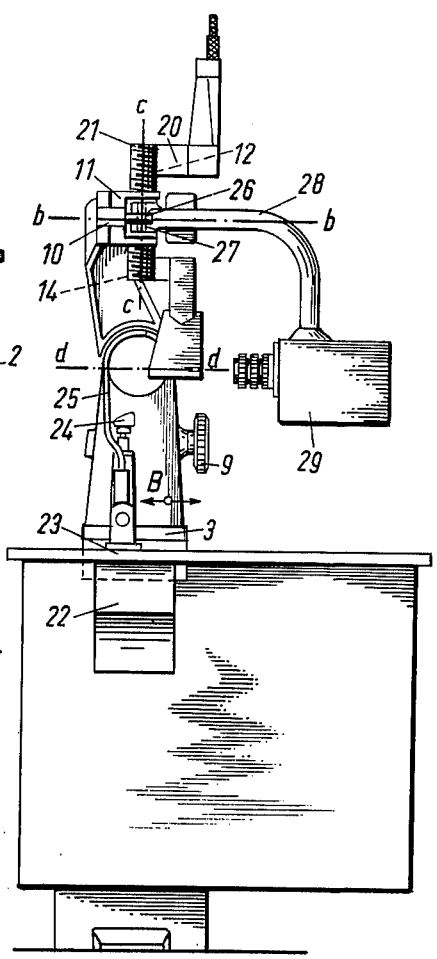

Curt Cüppers, Giessen, and Kurt Kirchhübel, Dutenhofen, Germany, assignors to Oculus Optikgerate G.m.b.H., Wetzlar, Germany
Filed Apr. 7, 1961, Ser. No. 101,505
Claims priority, application Germany, Apr. 12, 1960,
O 7,346
2 Claims. (Cl. 351—38)

This invention relates to apparatus for examining eyes and more particularly to a support for eye examination apparatus and instruments.

Many times a plurality of instruments are necessary or desirable to examine the eyes, and particularly a slit lamp, an ophthalmoscope, an ophthalmo meter, and a glasses determination device. If for examinations the various devices and instruments are mounted on a stand, the devices must be adjustable one after the other before the eyes of the person being examined and also in the case when the supports for the individual instruments are secured on a common carrier.

It is therefore an object of the invention to provide an instrument support in which the various devices may be adjusted quickly one after the other before the eyes of the patient and all the devices are mounted so that they may be rotated around a center point to bring such devices close to the pupil of the eye. This is particularly advantageous for the fundus and front examination of the eyes. A further advantage of the apparatus according to the invention resides in the fact that all the devices may be used with a single binocular lens and further also a television camera may be mounted on the apparatus in order to observe a picture of the eye on a picture screen.

The support according to the invention is characterized by a star-shaped rotary carrier with a securing means on each arm to carry an eye examination device or instrument whereby the securing means will permit each single device to be adjusted vertical to the rotary axis, and by a bearing the star-shaped carrier with the carrying arms may be rotatably mounted around an axis of the support. The carriers will have the same spacing as the optical axes of the individual devices. Also the axes of the star-shaped carrier and the arms carrying the devices are so arranged that the perpendicular projections of the swinging axes of the star-shaped carrier on the axes of the carrying arms relative to the optical axes of the devices will coincide with the planes of the axes.

Further objects will be apparent from the following description when considered in connection with the accompanying drawing in which;

FIGURE 1 is a front elevation of the supported apparatus in accordance with the invention, FIG. 2 is a side elevation of the apparatus of FIG. 1, and FIG. 3 is a side view of a detail showing the securing of a common binocular glass.

A cabinet or casing 2 is supported on a suitable base at the bottom and has a plate 1 mounted on the top thereof with a cross-slide guide 3 secured thereon. A pedestal base 4 is secured on the guide 3 and such base supports a stand so that the base 4 may be adjusted in the directions of the double arrow A, FIG. 1, and the double arrow B, FIG. 2, in right angle movements on the plate 1. The upper end of the pedestal 4 has a forked upper part 5 in which a pivot pin 6 is secured. The pin 6 has an axis indicated by the line a—a of FIG. 1. This axis a—a forms the pivot axis for a carrying arm 7 which has a depending lug or bearing eye 8 which is adjacent the fork ends 5 and through which the pin 6 passes. In order to secure the carrying arm 7 in adjusted position any suitable clamping device, not shown, may be provided and which may be actuated by a hand grip wheel 9.

The carrying arm 7 is formed with a right angle bent portion as best shown in FIG. 1 and carries at its free end a bearing spindle 10, FIG. 2, the axis of which is indicated by line b—b. This axis b—b is at right angles to the axis a—a of the pin 6. A bearing bushing 11 is rotatably mounted on the spindle 10 and this bushing is in the form of a star-shaped carrier for the four arms 12 to 15 and each arm has a round peg or trunnion with an axis designated c—c of FIG. 2. The arm members 12, 13, 14, and 15 serve the purpose of providing carriers for the various instruments individually used during and for eye examinations, and actually a slit lamp 16, an ophthalmoscope 17, an ophthalmo meter 18 and a spectacle measuring device 19 are mounted on these arm members 12 to 15 respectively. Each device has an arm 20 with a shell socket attachment 21 and by means of this socket 21, the instruments will be mounted on the arms 12 to 15 and held by any suitable means, not shown, in such a way that the socket 21 and therewith the instruments may be adjusted around any one of the arms 12 to 15.

The drawing shows the instrument 18 which is in line with the optical axis d—d, FIG. 2, and this axis is parallel to the axis b—b of the star-shaped carrier 11 to 15. The axes of all instruments have the same distance from the axis b—b and actually the distance of the axis a—a of the carrier arm 7 from the axis b—b is measured in the same plane as the axes a—a and d—d. Further the vertical projection of the axis b—b on the plane through the axes d—d and a—a, that is the optical axis d—d of each instrument remains the same for the oscillation of the carrying arms 7 around the axis a—a and upon rotation of the instruments around the axis c—c will be directed on the same point.

A platform 22 is secured on the cabinet 2 and this platform has a narrow table plate 23 secured thereon. A chin rest 24 with a head piece 25 is mounted on the plate 23 and this rest extends vertically. This chin rest is adjusted so that the eyes to be examined are at a height coinciding with the axis d—d which is on the level with the examination apparatus. Now by the sliding of the pedestal 4 on the plate 1, the support is so arranged that the axis d—d of the particular apparatus as well as the axis c—c will pass through the point of rotation of the eyes. Now the examination of the eyes can commence, and by swinging the star-shaped carrier 11 to 15 around 90° at a time, all four devices or instruments can be brought into action so that in any case the optical axis of the apparatus in use will be directed on the eye. Therefore no new setting of the entire apparatus is necessary.

In order to utilize a binocular lens and a television camera for all examination apparatus, there is provided a bearing eye 26 on the spindle 10. The opening in the eye 26 is mounted on a spindle 27, the axis of which coincides with the axis c—c. Around this spindle 27 an arm 28 may swing, on the lower end of which a television camera 29 is carried, the optical axis of which coincides with the axis d—d. This is also the case when the arm 7 is swung around the axis a—a, or one of the devices 16 to 19 may be swung around the axis c—c. The latter can be coupled, not shown, to the camera by means of the apparatus locally in use. In this way the camera will hold its place when star-shaped carrier 10 to 15 is rotated around the axis b—b.

In place of the camera 29 a binocular lens 31 may be provided on the respective arm 30 on the spindle 27 so that a binocular lens may be used for all the instruments of the apparatus.

We claim as our invention:

1. Apparatus for the examination of the eyes comprising a casing and having a horizontal plate secured thereon, a cross slide guide mounted on the plate and slidable in a plurality of directions on the plate, a pedestal base mounted on the cross slide guide, a carrying arm secured on the upper end of the pedestal base by means of a joint on a first horizontal axis, a plurality of arms mounted on the carrying arm around a second axis which is perpendicular to the first axis but spaced thereabove, an eye examination instrument mounted on each of said plurality of arms and having the optical axis of each instrument as a third axis in its position of use perpendicular to the first axis and in the same plane therewith and outside of the second axis, each instrument in use being also swingable around a vertical axis as a fourth axis, said fourth axis being in the same plane as the first axis and the third axis is vertical to the first axis so that the first axis as well as the third axis and the fourth axis will cut each other in a common point, and a chin rest for a head of a patient so arranged that the middle point of the eye is in the cutting point of the first, third and fourth axes.

2. An apparatus according to claim 1, in which a bearing is provided to rotatably support the carrying arms with their instruments as a unit, and in which a further arm is provided with a television camera and mounted on the bearing coinciding with the second axis.

References Cited by the Examiner

UNITED STATES PATENTS

| 328,277 | 10/85 | Bausch | 88—39 |
| 2,235,319 | 3/41 | Jobe | 88—20 |

FOREIGN PATENTS

| 1,100,247 | 3/55 | France. |
| 1,218,384 | 12/59 | France. |
| 862,730 | 3/61 | Great Britain. |

JEWELL H. PEDERSEN, *Primary Examiner.*

WILLIAM MISIEK, *Examiner.*